US007252749B2

(12) United States Patent
Zhou et al.

(10) Patent No.: US 7,252,749 B2
(45) Date of Patent: Aug. 7, 2007

(54) DEPOSITION METHOD FOR NANOSTRUCTURE MATERIALS

(75) Inventors: Otto Z. Zhou, Chapel Hill, NC (US); Bo Gao, Carrboro, NC (US); Guozhen Yue, Carrboro, NC (US); Soojin Oh, Carrboro, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 09/996,695

(22) Filed: Nov. 30, 2001

(65) Prior Publication Data
US 2003/0102222 A1 Jun. 5, 2003

(51) Int. Cl.
*C25D 13/02* (2006.01)
(52) U.S. Cl. .................. 204/484; 485/490; 485/491; 445/51
(58) Field of Classification Search ............... 204/490, 204/491, 486, 484, 485; 445/51
See application file for complete search history.

(56) References Cited

U.S. PATENT DOCUMENTS

| | | | | |
|---|---|---|---|---|
| 3,037,923 | A * | 6/1962 | Gnau | 204/490 |
| 5,296,117 | A * | 3/1994 | De Jaeger et al. | 204/486 |
| 5,795,456 | A * | 8/1998 | Friedman et al. | 204/484 |
| 5,906,721 | A * | 5/1999 | Bojkov et al. | 204/491 |
| 6,258,237 | B1 * | 7/2001 | Gal-Or et al. | 204/548 |
| 6,277,318 | B1 | 8/2001 | Bower et al. | |
| 6,280,697 | B1 | 8/2001 | Zhou et al. | |
| 6,319,381 | B1 * | 11/2001 | Nemelka | 204/485 |
| 6,333,968 | B1 | 12/2001 | Whitlock et al. | |
| 6,334,939 | B1 | 1/2002 | Zhou et al. | |
| 6,342,755 | B1 * | 1/2002 | Russ et al. | 313/310 |
| 6,456,691 | B2 | 9/2002 | Takahashi et al. | |
| 6,462,935 | B1 * | 10/2002 | Shiue et al. | 361/511 |
| 6,616,497 | B1 * | 9/2003 | Choi et al. | 445/24 |
| 6,652,967 | B2 * | 11/2003 | Yadav et al. | 428/403 |
| 6,824,755 | B2 * | 11/2004 | Colbert et al. | 423/447.1 |
| 2002/0193040 | A1 | 12/2002 | Zhou | |

(Continued)

FOREIGN PATENT DOCUMENTS

CN 1273215 11/2000

(Continued)

OTHER PUBLICATIONS

Affoune, A. M. et al., "Electrophoretic Deposition of Nanosized Diamond particles", Langmuir 2001, 17, 547-551.*

(Continued)

Primary Examiner—Kishor Mayekar
(74) Attorney, Agent, or Firm—Jenkins, Wilson, Taylor & Hunt, P.A.

(57) ABSTRACT

A method for depositing a coating of a nanostructure material onto a substrate includes: (1) forming a solution or suspension of containing the nanostructure material; (2) selectively adding "chargers" to the solution; (3) immersing electrodes in the solution, the substrate upon which the nanostructure material is to be deposited acting as one of the electrodes; (4) applying a direct and/or alternating current electrical field between the two electrodes for a certain period of time thereby causing the nanostructure materials in the solution to migrate toward and attach themselves to the substrate electrode; and (5) subsequent optional processing of the coated substrate.

106 Claims, 9 Drawing Sheets

SWNT Suspension

U.S. PATENT DOCUMENTS

| | | |
|---|---|---|
| 2003/0044519 A1* | 3/2003 | Takai et al. .................. 445/51 |
| 2003/0102222 A1 | 6/2003 | Zhou et al. |
| 2003/0111946 A1 | 6/2003 | Talin |

FOREIGN PATENT DOCUMENTS

| | | |
|---|---|---|
| EP | 989579 A2 * | 3/2000 |
| JP | 2002301700 | 10/2002 |
| WO | 2003075372 WO | 9/2003 |

OTHER PUBLICATIONS

C. Bower et al., "Plasma-induced alignment of carbon nanotubes", *Appl. Phys. Lett.*, vol. 77, No. 6, Aug. 7, 2000, pp. 830-832.

C. Journet et al., "Large-scale production of single-walled carbon nanotubes by the electric-arc technique", *Nature*, vol. 388, Aug. 21, 1997, pp. 756-760.

U.S. Appl. No. 09/296,572, filed Apr. 22, 1999.

U.S. Appl. No. 09/351,537, filed Jul. 1, 1999.

U.S. Appl. No. 09/679,303, filed Oct. 6, 2000.

U.S. Appl. No. 09/817,164, filed Mar. 27, 2001.

U.S. Appl. No. 09/881,684, filed Jun. 18, 2001.

B. Gao et al., "Fabrication and Electron Field Emission Properties of Carbon Nanotube Films by Electrophoretic Deposition", *Advanced Materials*, vol. 13, Issue 23, pp. 1770-1773, published on-line Nov. 23, 2001.

International Search Report for PCT/US04/20150 dated Mar. 10, 2006.

International Preliminary Report for PCT/US2004/020150 dated Apr. 6, 2006.

Chinese Office Action for Chinese Patent Application No. 02827708.2 dated Jan. 12, 2007.

Zhengping et al., "Progress in Bulk-Optic-Material Current Sensors", Lasers and optoelectronics progress 1999, vol. 36, 8, pp. 6-12.

* cited by examiner

US 7,252,749 B2

DEPOSITION METHOD FOR NANOSTRUCTURE MATERIALS

STATEMENT REGARDING FEDERALLY SPONSORED RESEARCH OR DEVELOPMENT

At least some aspects of this invention were made with Government support under contract no. N00014-98-1-0597. The Government may have certain rights in this invention.

FIELD OF THE INVENTION

The present invention relates to methods of depositing a nanostructure or nanotube-containing material onto a substrate, and associated structures and devices.

BACKGROUND OF THE INVENTION

In the description of the background of the present invention that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

The term "nanostructure" material is used by those familiar with the art to designate materials including nanoparticles such as $C_{60}$ fullerenes, fullerene-type concentric graphitic particles; nanowires/nanorods such as Si, Ge, $SiO_x$, $GeO_x$, or nanotubes composed of either single or multiple elements such as carbon, $B_xN_y$, $C_xB_yN_z$, $MoS_2$, and $WS_2$. One of the common features of nanostructure materials is their basic building blocks. A single nanoparticle or a carbon nanotube has a dimension that is less than 500 nm at least in one direction. These types of materials have been shown to exhibit certain properties that have raised interest in a variety of applications and processes.

U.S. Pat. No. 6,280,697 to Zhou et al. (entitled "Nanotube-Based High Energy Material and Method"), the disclosure of which is incorporated herein by reference, in its entirety, discloses the fabrication of carbon-based nanotube materials and their use as a battery electrode material.

U.S. Pat. No. 6,630,772 to Bower et al. (based on U.S. patent application Ser. No. 09/296,572 entitled "Device Comprising Carbon Nanotube Field Emitter Structure and Process for Forming Device") the disclosure of which is incorporated herein by reference, in its entirety, discloses a carbon nanotube-based electron emitter structure.

U.S. patent application Ser. No. 09/351,537 entitled "Device Comprising Thin Film Carbon Nanotube Electron Field Emitter Structure", the disclosure of which is incorporated herein by reference, in its entirety, discloses a carbon-nanotube field emitter structure having a high emitted current density.

U.S. Pat. No. 6,277,318 to Bower et al. (entitled "Method for Fabrication of Patterned Carbon Nanotube Films"), the disclosure of which is incorporated herein by reference, in its entirety, discloses a method of fabricating adherent, patterned carbon nanotube films onto a substrate patterned with a carbide-forming material, a carbon-dissolving material, or a low melting point metal. Carbon-dissolving materials include elements such as Ni, Fe, Co, and Mn. Carbide-forming elements include elements such as Si, Mo, Ti, Ta, W, Nb, Zr, V, Cr, and Hf.

U.S. Pat. No. 6,334,939 to Zhou et al. (based on U.S. patent application Ser. No. 09/594,844 entitled "Nanostructure-Based High Energy Material and Method"), the disclosure of which is incorporated herein by reference, in its entirety, discloses a nanostructure alloy with alkali metal as one of the components. Such materials are described as being useful in certain battery applications.

U.S. Pat. No. 6,553,096 to Zhou et al. (based on U.S. patent application Ser. No. 09/679,303 entitled "X-Ray Generating Mechanism Using Electron Field Emission Cathode"), the disclosure of which is incorporated herein by reference, in its entirety, discloses an X-ray generating device incorporating a nanostructure-containing material.

U.S. Pat. No. 6,965,199 to Stoner et al. (based on U.S. patent application Ser. No. 09/817,164 entitled "Coated Electrode With Enhanced Electron Emission And Ignition Characteristics") the disclosure of which is incorporated herein by reference, in its entirety, discloses an electrode including a first electrode material, an adhesion-promoting layer, and a carbon nanotube-containing material disposed on at least a portion of the adhesion promoting layer, as well as associated devices incorporating such an electrode.

U.S. Pat. No. 6,787,122 to Zhou (based on U.S. patent application Ser. No. 09/881,684 entitled "Method of Making Nanotube-Based Material With Enhanced Field Emission") the disclosure of which is incorporated herein by reference, in its entirety, discloses a technique for introducing a foreign species into the nanotube-based material in order to improve the emission properties thereof.

As evidenced by the above, nanostructure materials, such as carbon nanotubes possess promising properties, such as electron field emission characteristics which appear to be far superior to that of conventional field emitting materials. In particular, carbon-nanotube materials exhibit low emission threshold fields as well as large emission current densities. Such properties make them attractive for a variety of microelectronic applications, such as lighting elements, field emission flat panel displays, gas discharge tubes for over voltage protection, and x-ray generating devices.

However, the effective incorporation of such materials into these devices has been hindered by difficulties encountered in the processing of such materials. For instance, carbon nanotubes are produced by techniques such as laser ablation and arc discharge methods. Carbon nanotubes produced by such techniques are collected, subjected to further processes (e.g.—filtration and/or purification) and subsequently deposited or otherwise incorporated into the desired device. Thus, according to these conventional techniques, it is not possible to directly form carbon nanotubes onto a substrate or carrier material.

Post-formation methods such as screen printing and spraying have been utilized to deposit pre-formed carbon nanotubes on a substrate. However, such techniques pose certain drawbacks. For instance, screen printing requires the use of binder materials as well as an activation step. Spraying can be inefficient and is not practical for large-scale fabrication.

Carbon nanotubes have been grown directly upon substrates by use of chemical vapor deposition (CVD) techniques. However, such techniques require relatively high temperatures (e.g.—600-1,000° C.) as well as reactive environments in order to effectively grow the nanotubes. The requirement for such harsh environmental conditions severely limits the types of substrate materials which can be utilized. In addition, the CVD technique often results in mutli-wall carbon nanotubes. These mutli-wall carbon nanotubes generally do not have the same level of structural perfection and thus have inferior electronic emission properties when compared with single-walled carbon nanotubes.

Thus, there is a need in the art to address the above-mentioned disadvantages, and others, associated with conventional fabrication techniques.

SUMMARY OF THE INVENTION

The present invention addresses the above-mentioned disadvantages associated with the state of the art, and others.

For example, the present invention provides a process for depositing pre-formed nanostructure material, such as carbon nanotubes, onto a substrate material utilizing electrophoretic deposition.

According to one embodiment, the present invention provides a method of depositing a nanostructure-containing material onto a substrate, the method comprising:

(i) forming a suspension of pre-formed nanostructure-containing material in a liquid medium;

(ii) selectively adding one or more chemicals ("chargers") to the liquid medium;

(iii) immersing two electrodes in the suspension, wherein at least one of the electrodes comprises the substrate; and (iv) applying a direct or alternating current to the immersed electrodes thereby creating an electrical field between the electrodes;

whereby the nanostructure-containing material is caused to migrate toward, and attach to, the substrate.

According to another embodiment, the present invention provides a method of attaching a single nanotube or nanowire onto a sharp tip of a sharp object, the method comprising:

(i) forming a suspension of pre-formed nanostructure-containing material in a liquid medium;

(ii) selectively adding a charger to the liquid medium;

(iii) immersing at least one electrode in the suspension;

(iv) placing the sharp tip directly above the surface of the suspension and on a stage where the tip can be moved closer or further away from the surface of the suspension; and (v) applying a direct or alternating current to the immersed electrode and the sharp object and electrically connecting a current meter to the sharp tip.

According to yet another embodiment, the present invention provides a method of depositing a nanostructure-containing multi-layer structure onto substrate, the method comprising:

(i) providing a multilayer structure comprising a substrate and a plurality of additional layers disposed on the substrate;

(ii) providing a plurality of exposed areas on a surface of the substrate;

(iii) forming a suspension of pre-formed nanostructure-containing material in a liquid medium;

(iv) selectively adding a charger to the liquid medium;

(v) immersing at least one electrode and the multilayer structure in the suspension;

(vi) applying a direct or alternating current to the electrode and the multilayer structure thereby creating an electrical field therebetween;

whereby the nanostructure-containing material is caused to migrate toward, and attach to, the exposed areas on the substrate.

According to another embodiment, the present invention provides a method of depositing a pattern of nanostructure-containing material onto a substrate, the method comprising:

(i) providing a substrate having a first surface with a mask disposed thereon, the mask having openings through which areas of the first surface are exposed;

(ii) forming a suspension of pre-formed nanostructure-containing material in a liquid medium;

(iii) selectively adding a charger to the liquid medium;

(iv) immersing at least one electrode and the masked substrate in the suspension;

(v) applying a direct or alternating current to the electrode and the masked substrate thereby creating an electrical field therebetween;

whereby the nanostructure-containing material is caused to migrate toward, and attach to, those exposed areas on the first surface of the substrate; and (vi) removing the mask.

BRIEF DESCRIPTION OF THE DRAWING FIGURES

DETAILED DESCRIPTION OF THE INVENTION

Figure 1A:
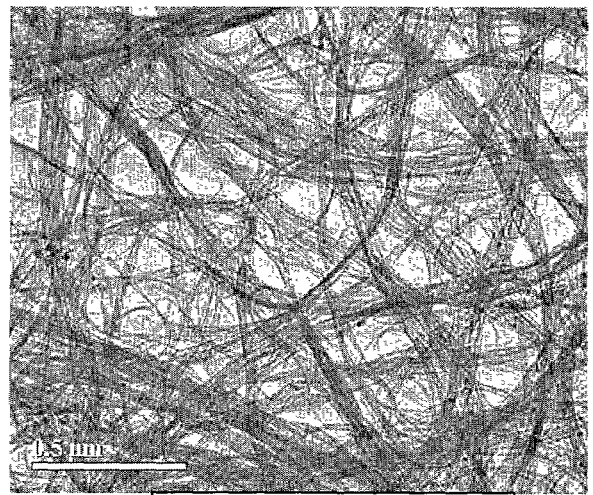
FIG. 1A is a transmission electron microscopic (TEM) image of purified single walled carbon nanotube bundles.

A method performed consistent with the principles of the present invention, and according to a preferred embodiment, along with corresponding structures and devices, are described as follows.

Generally, a method performed according to the principles of the present invention can include a combination of some or all of the following steps: (1) forming a solution or suspension containing the nanostructure material; (2) selectively adding "chargers" to the solution; (3) immersing electrodes in the solution, the substrate upon which the nanostructure material is to be deposited acting as one of the electrodes; (4) applying a direct and/or alternating current thus creating an electrical field between the electrodes for a certain period of time thereby causing the nanostructure materials in the solution to migrate toward and attach themselves to the substrate electrode; and (5) optional subsequent processing of the coated substrate.

The process begins with pre-formed raw nanostructure or nanotube-containing material, such as a carbon nanotube-containing material. This ra nanotube material can comprise at least one of single-walled carbon nanotubes and multi-walled carbon nanotubes. According to a preferred embodiment, the raw carbon nanotube-containing material comprises single-walled carbon nanotubes.

The raw carbon-containing material can be fabricated according to a number of different techniques familiar to those in the art. For example, the raw carbon nanotube-containing material can be fabricated by laser ablation techniques (e.g.—see U.S. Pat. No. 6,280,697), chemical vapor deposition techniques (see, e.g.—C. Bower et al., "Plasma Induced Conformal Alignment of Carbon Nanotubes on Curvatured Surfaces," Appl Phys Lett. Vol. 77, No. 6, pgs. 830-32 (2000)), or arc-discharge techniques (see, e.g.—C. Journet et al., Nature, Vol. 388, p. 756 (1997)).

It is also contemplated by the present invention that raw materials be in the form of nanotube structures with a composition of $B_x C_y$, $N_z$, (B=boron, C =carbon, and N=nitrogen), or nanotube or concentric fullerene structures with a composition $MS_2$ (M=tungsten, molybdenum, or vanadium oxide) can be utilized. These raw materials can be formed by any suitable technique, such as the above-mentioned arc-discharge technique.

It is also within the scope of the present invention that the raw materials are in the form of nanowires with at least one of the following: elemental metal, Si, Ge, oxide, carbide, nitride, chalcogenide. In addition, the raw materials can be in the form of nanoparticles of elemental metal, metal oxide, elemental and compound semiconducting materials.

Next, the raw carbon nanotube-containing material is subjected to purification. A number of techniques for purifying the raw materials are envisioned. According to one preferred embodiment, the raw material can be purified by reflux in a suitable solvent, such as a combination of peroxide ($H_2O_2$) and water, with an $H_2O_2$ concentration of 1-40% by volume, preferably about 20% by volume $H_2O_2$, with subsequent rinsing in $CS_2$ and then in methanol, followed by filtration. According to an exemplary technique, approximately 10-100 ml of peroxide is introduced into the medium for every 1-10 mg of nanotubes in the medium, and the reflux reaction is carried out at a temperature of 20-100° C. (see, e.g.—U.S. Pat. No. 6,553,096 to Zhou et al. (based on U.S. patent application Ser. No. 09/679,303)).

According to another alternative, the raw carbon nanotube-containing material is placed in a suitable liquid medium, such as an acidic medium, an organic solvent, or an alcohol, preferably methanol. The nanotubes are kept in suspension within the liquid medium for several hours using a high-powered ultrasonic horn, while the suspension is passed through a microporous membrane. In another embodiment, the raw materials can be purified by oxidation in air or an oxygen environment at a temperature of 200-700° C. The impurities in the raw materials are oxidized at a faster rate than the nanotubes.

In yet another embodiment, the raw materials can be purified by liquid chromatography to separate the nanotubes/nanowires from the impurities.

The raw material is then optionally subjected to further processing to shorten the nanotubes and nanotube bundles, such as chemical etching.

According to one embodiment, the purified carbon nanotube material can be subjected to oxidation in a strong acid. For instance, purified carbon nanotube material can be placed in an appropriate container in a solution of acid comprising $H_2SO_4$ and $HNO_3$. The carbon nanotubes in solution are then subjected to sonication for an appropriate length of time. After sonication, the processed nanotubes are collected from the acid solution by either filtration or centrifuging after repeated dilution with de-ionized water.

Figure 1B:
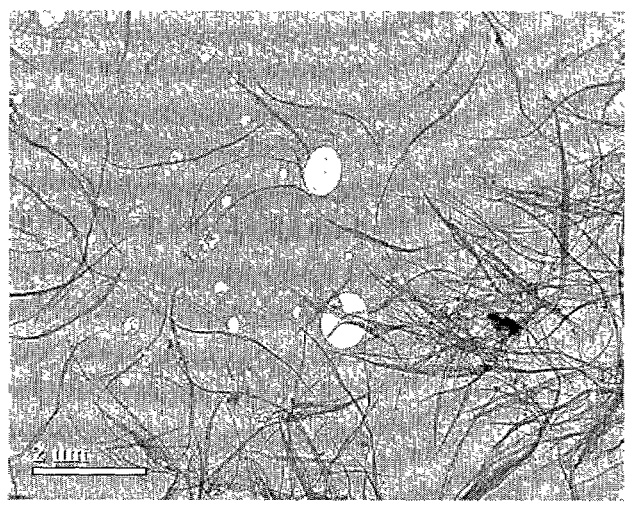
FIG. 1B is a TEM image of single walled carbon nanotubes etched to a 4 micron average bundle length.
Figure 1C:
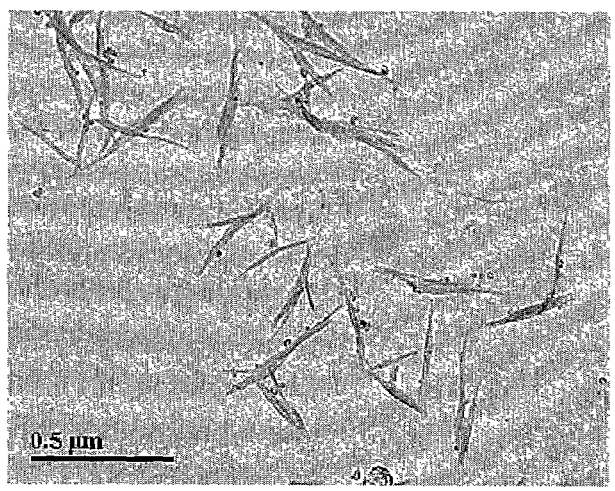
FIG. 1C is a TEM image of single walled carbon nanotubes etched to a 0.5 micron average bundle length.

An illustrative example of such a process is described as follows. Purified raw material formed as described above was found to contain approximately 90% single-walled nanotube bundles over 10 μm in length and 5-50 mn in bundle diameter. Such "long" nanotube bundles are illustrated by FIG. 1A. This material was chemically etched in a solution of $H_2SO_4$ and $HNO_3$ for 10-24 hours while being subjected to ultrasonic energy. After etching the single wall carbon nanotube bundles etched for 20 hours had an average length of 4 μm and the single wall carbon nanotube bundles etched for 24 hours had an average bundle length of 0.5 μm, as shown by the transmission electron microscopy images in FIGS. 1B-1C. Alternatively, the purified materials can be chemical functionalized by, for example, chemically or physically attaching chemical species to the outer surfaces of the carbon nanotubes such that they will be either soluble or form stable suspensions in certain solvents.

According to another alternative, the purified raw material can be shortened by mechanical milling. According to this technique, a sample of the purified carbon nanotube material is placed inside a suitable container, along with appropriate milling media. The container is then shut and placed within a suitable holder of a ball-milling machine. According to the present invention, the time that the sample is milled can vary. An appropriate amount of milling time can be readily determined by inspection of the milled nanotubes.

Regardless of the technique utilized, the preferred length of the shortened material, such as the above-mentioned nanotubes and nanotube bundles, is approximately 0.1-100 micrometers, preferably 0.1-10 micrometers, and more preferably 0.3-3.0 micrometers.

The purified raw material, regardless of whether subjected to the above-described shortening process, can also optionally be annealed at a suitable temperature, such as 100° C.-1200° C. According to a preferred embodiment, the annealing temperature is 100° C.-600° C. The material is annealed for a suitable time period, such as approximately 1 to 60 minutes. According to a preferred embodiment, the material is annealed for approximately 1 hour. The material is annealed in a vacuum of about $10^{-2}$ torr, or at an even higher vacuum pressure. According to a preferred embodiment, the vacuum is about $5 \times 10^{-7}$ torr.

The above described "raw" or pre-formed material can now be introduced into a solution for deposition onto a substrate.

A suitable liquid medium is selected which will permit the formation of a stable suspension of the raw nanostructure material therein. According to a preferred embodiment the liquid medium comprises at least one of water, methanol, ethanol, alcohol, and dimethylformamide (DMF). According to a further preferred embodiment, the liquid medium comprises ethanol. Upon adding the raw material to the liquid medium, the mixture can optionally be subjected to ultrasonic energy or stirring using, for example, a magnetic stirrer bar, in order to facilitate the formation of a stable suspension. The amount of time that the ultrasonic energy is applied can vary, but it has been found that approximately two hours at room temperature is sufficient.

The concentration of raw material in the liquid medium can be varied, so long as a stable suspension is formed. For example, with a liquid medium comprising methanol, approximately 0.01 mg of the raw material, such as single-walled carbon nanotubes, can be present per ml of the liqu and provide a stable suspension. When the liquid medium comprises DMF, approximately 0.4-0.5 mg of the raw material, such as single-walled carbon nanotubes, can be present per ml of the liquid medium (0.4-0.5 mg/ml) and provide a stable suspension. When shortened carbon nanotubes are used, stable suspension can be obtained at a higher concentration. For example, a stable dispersion of approximately 0.1 mg/ml of shortened nanotubes in water can be formed.

According to a preferred embodiment, a "charger" is added to the suspension in order to facilitate electrophoretic deposition. One such preferred charger is $MgCl_2$. Some other chargers include $Mg(NO_3)_2$, $La(NO_3)_3$, $Y(NO_3)_3$, $AlCl_3$, and sodium hydroxide. Any suitable amount can be utilized. Amounts ranging from less than 1% up to 50%, by weight, as measured relative top to the amount of nanostructure-containing material, are feasible. According to a preferred embodiment, the suspension can contain less than 1% of the charger.

A plurality of electrodes are then introduced into the suspension. According to a preferred embodiment, two electrodes are utilized. One of the electrodes comprises the substrate upon which the nanostructure material is to be deposited. Any suitable substrate material is envisioned, so long as it possesses the requisite degree of electrical conductivity. According to a preferred embodiment, the substrate is either metal or doped silicon.

An alternating current, or a direct current is applied to the electrodes thereby producing an electrical field between the electrodes. This causes the nanostructure material in the suspension to migrate toward and attach to the substrate electrode. According to one embodiment, the electrical field applied between electrodes is 0.1-1000 V/cm, and a direct current of 0.1-200 $mA/cm^2$ is applied for 1 second-1 hour.

Figure 2:
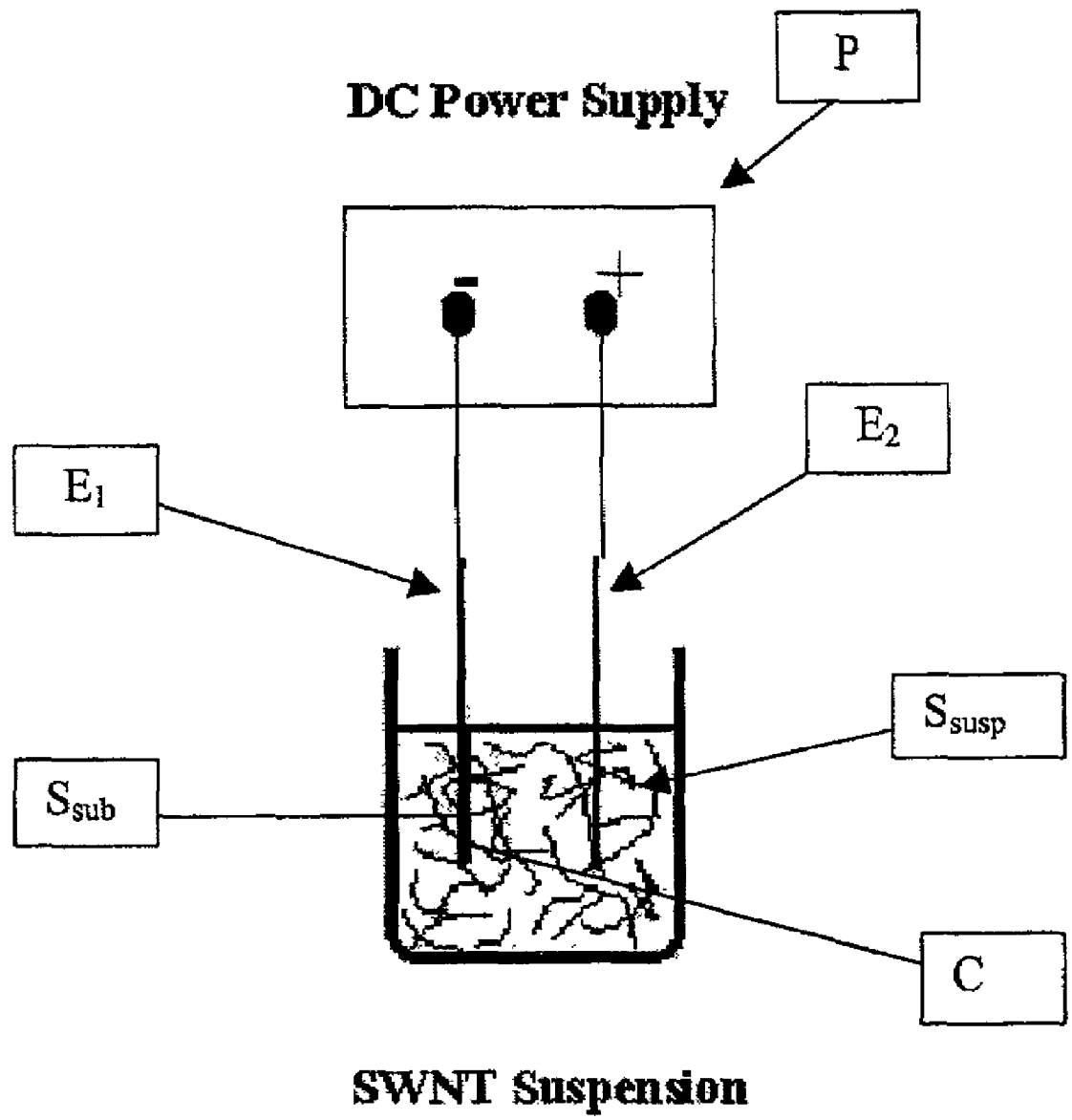
FIG. 2 is a schematic illustration of an electrophoretic deposition process according to the principles of the present invention.

FIG. 2 is a schematic illustration of the above-described process. As illustrated in FIG. 2, a pair of electrodes $E_1$ and $E_2$ are introduced into the suspension $S_{susp}$. The electrodes $E_1$ and $E_2$ are connected to a power supply P, which produces an electrical field between $E_1$ and $E_2$. Depending on the charge of the nanostructure material contained in the suspension $S_{susp}$, the nanostructure material will migrate toward and attach to one of the electrodes thereby forming a coating C of the nanostructure material on one of the electrodes. In the illustrative example, the substrate $S_{sub}$ is the negative electrode $E_1$, or anode.

According to a preferred embodiment, the above-described electrophoretic deposition is carried out at room temperature.

The rate of deposition of the coating C, as well as its structure and morphology can be influenced by many factors. Such factors include: the concentration of nanostructure material in the suspension $S_{susp}$, the concentration of the charger material (e.g. —$MgCl_2$) in the suspension $S_{susp}$, the conductivity of the substrate, and control of the power source P.

Figure 3A:
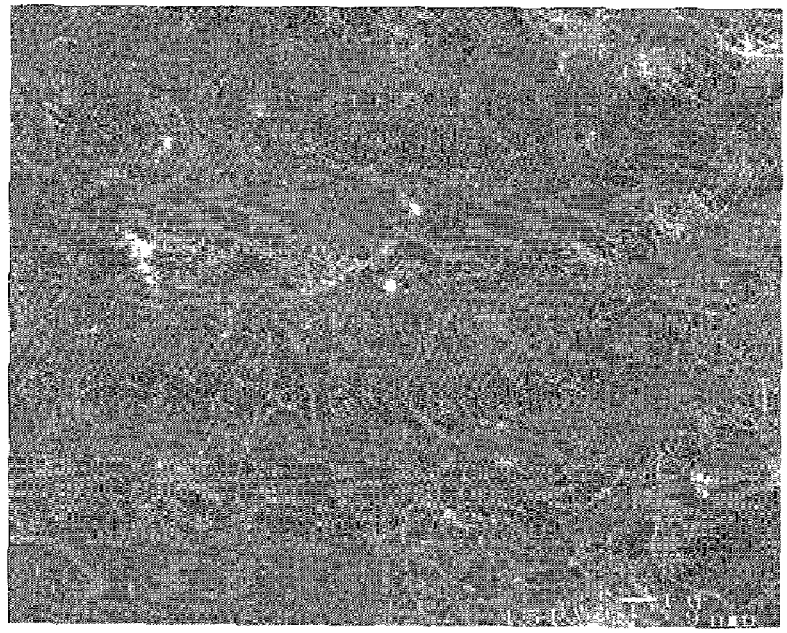
FIG. 3A is a scanning electron microscope (SEM) image of a coating of "long" single-walled carbon nanotubes onto a substrate according to the principles of the present invention.

By way of illustration, a stainless steel substrate/electrode and a counter electrode were introduced into a suspension comprising DMF and single-walled carbon nanotubes at a concentration of 0.4 mg/ml, and $MgCl_2$. A direct current was applied resulting in an electrical field of approximately 20 V/cm formed between the electrodes. Application of the current for about 30 seconds results in the formation of a smooth film of single-walled carbon nanotubes on the substrate. After application of direct current for approximately 10 minutes, a thin film of single-walled carbon nanotubes approximately 1 micrometer thick was deposited on the substrate. This film was examined using a scanning electron microscope, and is illustrated in FIG. 3A. The morphology of the deposited coating or film is similar to that of coating or film applied by spraying, and comprises clearly defined single-walled carbon nanotube bundles.

Figure 3B:
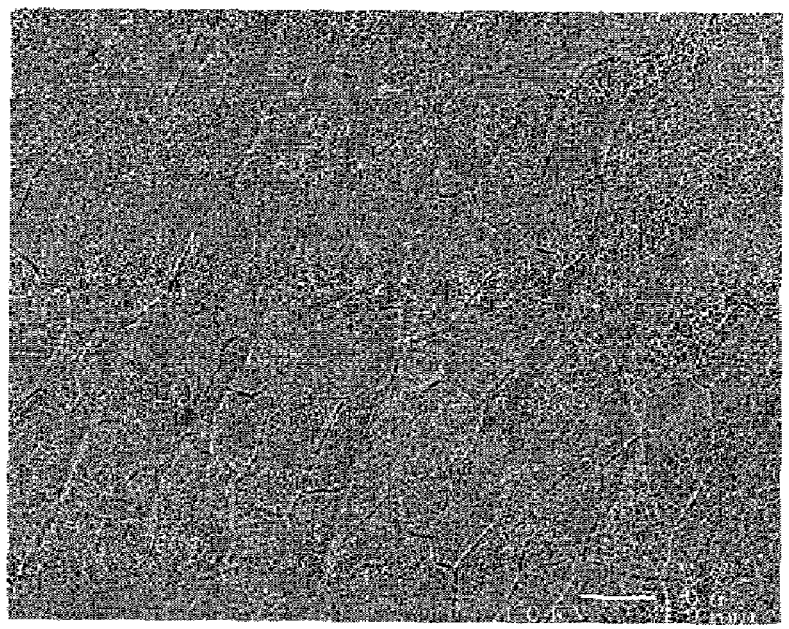
FIG. 3B is a SEM image of a coating of "short" single-walled carbon nanotubes onto a substrate according to the principles of the present invention.

FIG. 3B is a SEM image of a coating of single-walled carbon nanotube bundles deposited by electrophoretic deposition in the manner described above. However, the nanotubes were subjected to a previously described process to shorten their length (e.g.—to about a 0.5 μm average bundle length). The film depicted in FIG. 3 was densified by sintering in vacuum at a suitable temperature (e.g.—800° C.). This coating comprises distinct grain boundaries with densely packed grains. Individual single-walled carbon nanotube bundles are no longer discernable.

The particular electrode (i.e.—anode or the cathode) to which the nanostructure material migrates can be controlled through the selection of the charger material. For example, the use of a "negative" charger, such as sodium hydroxide (NaOH) imparts a negative charge to the nanostructure material, thereby creating a tendency for the nanostructure material to migrate towards the positive electrode (cathode). Conversely, when a "positive" charger material is used, such as $MgCl_2$, a positive charge is imparted to the nanostructure material, thereby creating a tendency for the nanostructure material to migrate toward the negative electrode (anode).

The electrodes are removed from the suspension after a suitable deposition period. The coated substrate electrode may optionally be subjected to further processing. For example, the coated substrate may be annealed to remove the liquid medium. Such an annealing procedure may be preferable, since removal of impurities such as residual suspension medium improves the emission characteristics of the nanostructure material. By way of example, the coated substrate can be heated to a temperature of approximately 100-1200° C. for approximately 1 hour, and then at approximately 800° C. for 2 hours, both at a vacuum of approximately $5 \times 10^{-7}$ torr.

The emission characteristics of a film of single-walled carbon nanotubes (SWNT) formed according to the present invention has been evaluated and compared to that of SWNT materials prepared by other techniques. The results are summarized in following table.

In the following table, the measurements were made using a constant DC voltage. The threshold field is defined as the electrical field required for the emission current density to reach 0.01 $mA/cm^2$. The current decay is calculated by $(I_{initial}-I_{final})/I_{initial}$, where $I_{initial}$ is the initial emission current and $I_{final}$ is the emission current after 10 h of measurement.

| Materials | Threshold field [V/micrometer] | Initial emission current density [$mA/cm^2$] | Emission current decay after 10 hours [%] |
|---|---|---|---|
| As-grown SWNT mat | 1.3 | 200 | 50 |
| Purified SWNT paper (made by filtration) | 1.0 | 93 | 40 |
| CVD SWNT film [a] | 3.1 | 10 | 79 |
| EPD long SWNT film | 1.4 | 83 | 3 |

Figure 4:
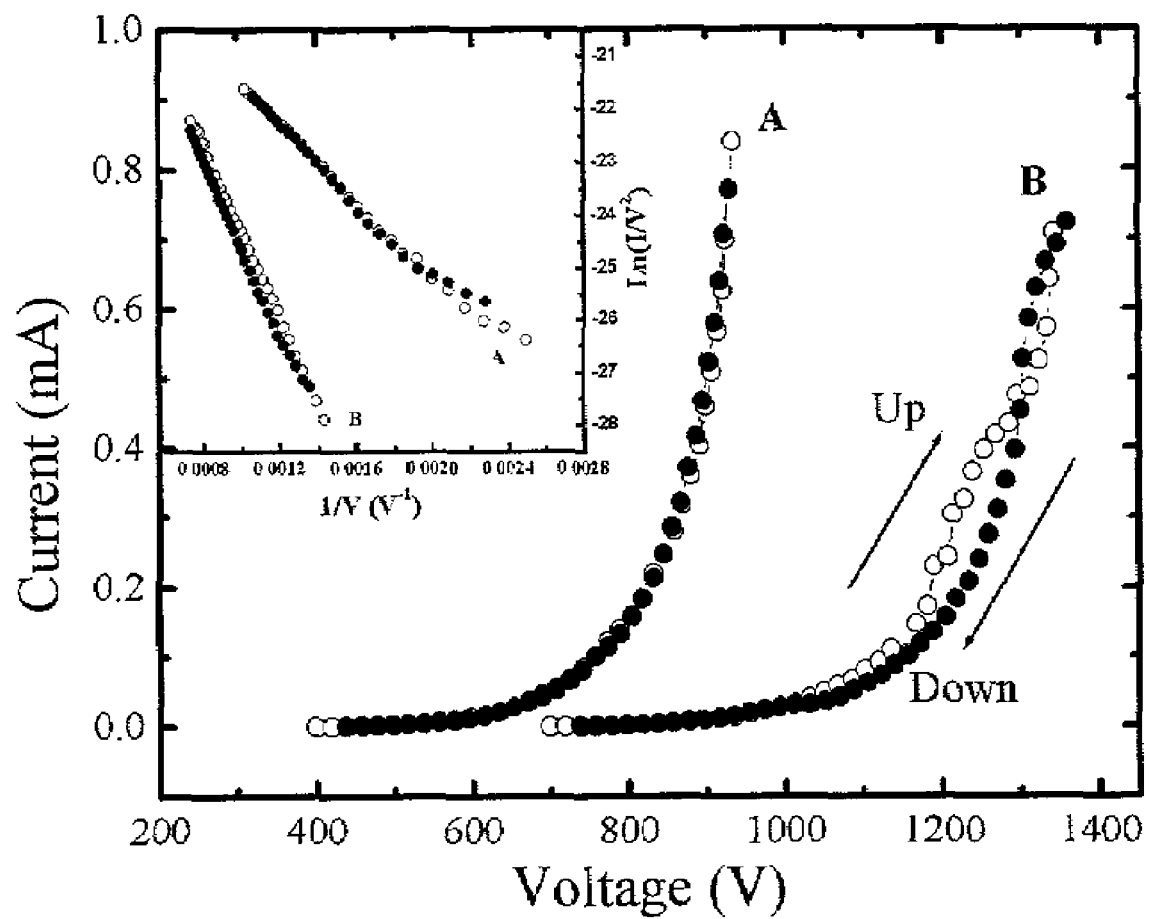
FIG. 4 is a plot of the measured electron field emission current versus the applied electrical field from a single-wall carbon nanotube films formed by the process of the present invention.

FIG. 4 is a plot of the total electron field emission current versus applied voltage for two samples of nanotube films A and B. Sample A was formed as previously described, using methanol as a suspension media. Sample B was formed using DMF as a suspension media. For both samples, the measurements were made over a 6 mm² emissions area at a cathode-anode distance of 160 μm at a base pressure of 2×10⁻⁷ torr. The inset portion of FIG. 4 represents the same data plotted as I/V² versus I/V, which shows a substantially linear behavior which is indicative of field emission of electrons.

According to the present invention, a film is formed having a threshold field for emission of less than 1.5 volts/micrometer. The film can produce an emission current density greater than 1 A/cm². The film can produce a total emission current greater than 10 mA over a 6 mm² area. The film can also produce a pulsed emission current having a pulse frequency higher than 10 KHz, preferably higher than 100 KHz. The total pulsed current measured over a 6 mm² area is preferably higher than 10 mA at 10-12 V/μm. Moreover, the emission current is capable of being consistently reproduced, without decay, even after a number of pulsed emissions, as evidenced by the above data. For instance, the pulsed current is stable and higher than 10 mA over a 6 mm² area for at least 1,000 pulses, preferably for at least 10,000 pulses.

As apparent from the above, the single-walled carbon nanotube film formed according to the principles of the present invention exhibit excellent field emission characteristics, especially in the area of resistance to emission current density decay.

The coating of nanostructure materials deposited according to the principles of the present invention exhibit better adhesion that a similar coatings applied by other techniques such as spraying. While not wishing to be limited by any particular theory, the improved adhesion may be due to the formation of metal hydroxide on the surface of the substrate (formed from metal ions of the electrode and OH groups from the charger). The films formed according to the principles of the present invention also exhibit improved field emission stability (i.e.—higher resistance to field emission decay).

According to a further embodiment, the adhesion of nanotubes to the substrate can be further improved by incorporation of adhesion promoting materials such as binders, carbon-dissolving or carbide-forming metal and high temperature annealing. These materials can be introduced by, for example, one of the following processes: co-deposition of the nanostructures and particles of adhesion promoting materials, sequential deposition, pre-deposition of a layer of adhesion promoting materials, etc.

In one embodiment, binders such as polymer binders are added to the suspension of the nanostructure-containing material which is then either stirred or sonicated to obtain a uniform suspension. Suitable polymer binders include poly (vinyl butyral-co vinyl alcohol-co-vinyl acetate) and poly (vinylidene fluoride). Suitable chargers are chosen such that under the applied electrical field, either DC or AC, the binder and the nanostructures would migrate to the same electrodes to form a coating with an intimate mixing of the nanostructures and the binder.

In another embodiment, small metal particles such as titanium, iron, lead, tin, cobalt are mixed into the suspension of the nanostructure-containing material. Suitable chargers are chosen such that under the applied electrical field, the metal particles and the nanostructures will migrate to the desired electrode to form a uniform coating with an intimate mixing of the metal particles and the nanostructures. After deposition, the coated substrate is annealed in vacuum with a base vacuum pressure of 10⁻³ torr or greater for 0.1-10 hours. Preferably, the diameter of the particles is smaller than 1 micrometer.

The binders or adhesion promoting materials can be added in any suitable amount. Amounts ranging from 0.1-20% by weight, measured relative to the amount of nanostructure-containing material is envisioned.

In another embodiment, the substrate to be coated with the nanostructures is first coated with at least one layer of adhesion-promoting metal such as titanium, iron, lead, tin, cobalt, nickel, tantalum, tungsten, niobium, zirconium, vanadium, chromium or hafnium. The layer can be applied by techniques such as electrochemical plating, thermal evaporation, sputtering or pulsed laser deposition. After electrophoretic deposition of the nanostructures, the film is annealed in vacuum with a base vacuum pressure of 10⁻³ torr or greater for 0.1-10 hours.

Thus, the above-described processes are advantageously well-adapted for high output and automation. These processes are very versatile and can be used to form uniform coatings of various thicknesses (e.g.—tens of nanometers to a few micrometers thick), coatings on complex shapes, as well as complicated structures such as composites and "gated" electrodes. The methods of the present invention are useful in producing nanotube materials which have properties that make them beneficial for use in a number of different applications. Generally, the method of the present invention is especially beneficial in providing nanotube material for incorporation into electron field emission cathodes for devices such as x-ray generating devices, gas discharge tubes, lighting devices, microwave power amplifiers, ion guns, electron beam lithography devices, high energy accelerators, free electron lasers, electron microscopes and microprobes, and flat panel displays.

The electrophoresis method of the present invention can used to coat substrates with composite layers in which nanostructured materials serve as one of the components. It can also be utilized to form multilayered structures on a supporting surface.

To deposit a composite layer containing nanostructure-containing material on a substrate, nanostructured materials and at least one more component (e.g.—polymer or metal particles) are suspended in a liquid medium to make up the electrophoresis bath. After selectively adding a "charger" to the suspension, two electrodes, wherein at least one of the electrodes comprises the substrate, are immersed in the suspension and a direct or alternating current is applied to the immersed electrodes thereby creating an electrical field between the electrodes. Because the nanostructured materials and the other component in the suspension are charged by the same "charger", they would migrate toward and attach to the same substrate simultaneously under the same electrical field. In the above described method, the composition of deposited composite layer is mostly decided by the composition of the suspension in which the electrophoresis has been carried out. Therefore, composite layers having different composition can be readily obtained by immersing a substrate in baths with deferent compositions and performing the above-described electrophoretic deposition.

While a composite layer can be made by electrophoresis using only one bath, multiple baths can be used to produce a multilayered electrophoretic deposition. The electrophoresis is carried out in each bath sequentially with each bath producing a layer of different composition in the multilayered structure. When the desired thickness of a layer is reached, the deposition electrode can be moved to the next suspension for deposition of the next layer.

The electrophoretic deposition technique disclosed can be further applied to deposit an individual or a bundle of carbon nanotubes or nanowires selectively onto a sharp tip. This sharp tip can be, for example, the tip used for microscopes including atomic force microscopes, scanning tunneling microscopes, or profilometers.

Figure 5A:
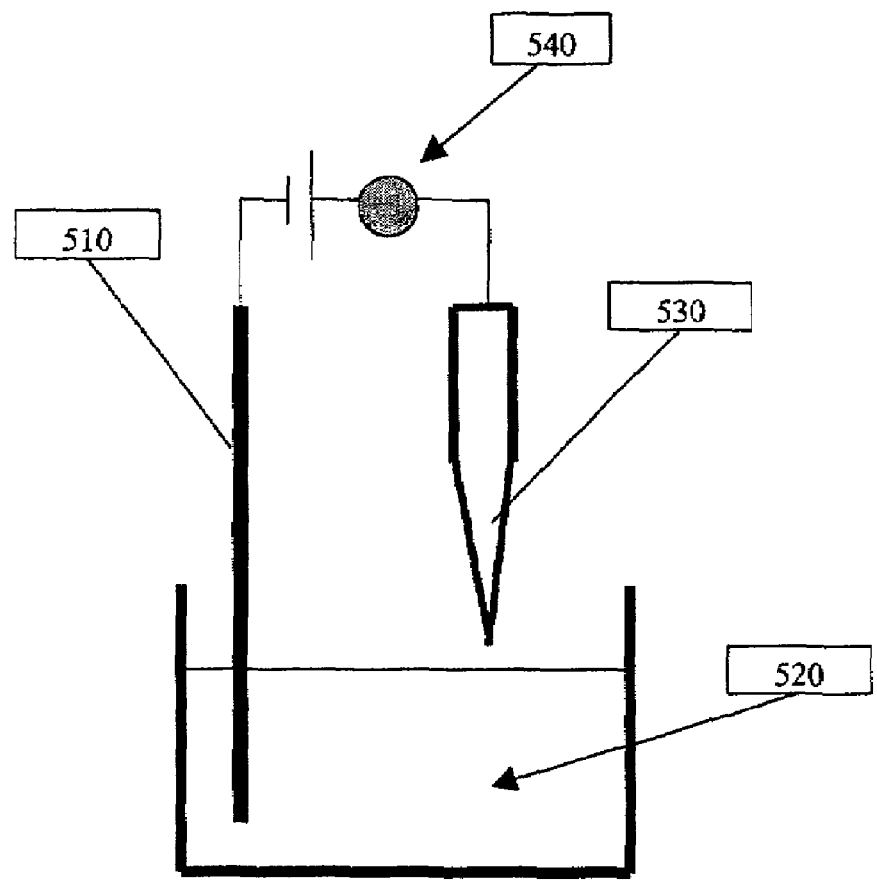
FIG. 5A is a schematic illustration of a process according to the present invention used to attach a bundle or a single carbon nanotube or a nanowire to an object with a sharp tip.
Figure 5B:
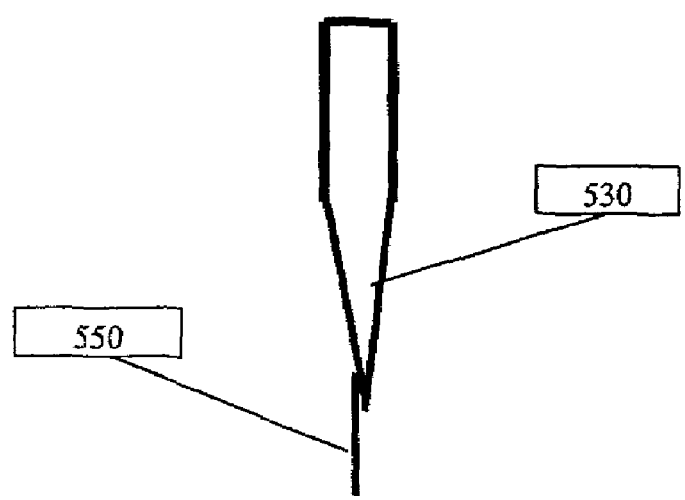
FIG. 5B is a schematic illustration of the sharp tip having an attached single carbon nanotube or nanowire formed according to a process as depicted in FIG. 5A.
Figure 5C:
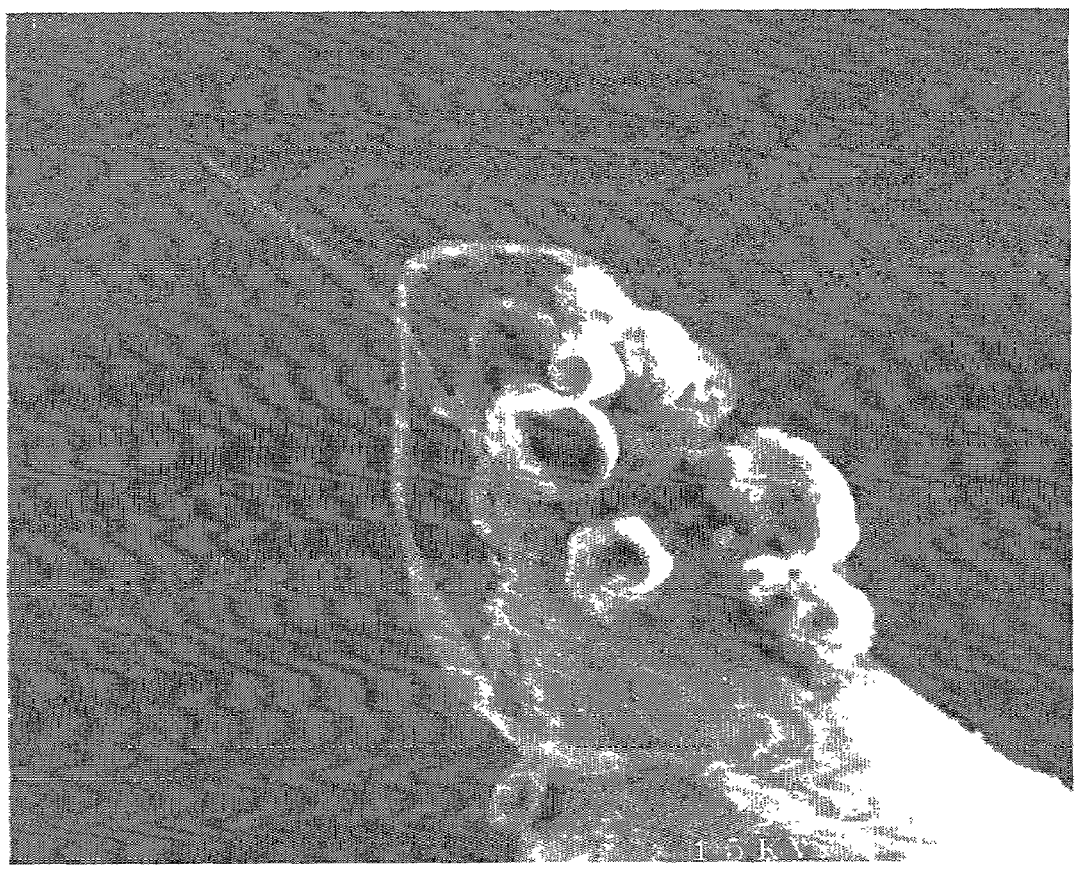
FIG. 5C is an SEM image the sharp tip having an attached single carbon nanotube or nanowire formed according to a process of the present invention.

One such embodiment is illustrated in FIGS. 5A-5B, where a dilute suspension of nanotube or nanowire is first prepared. A counter electrode 510 is first immersed into the suspension 520. The metal tip 530 is used as the second electrode. It is first placed perpendicular to the suspension surface with the sharp tip, where the nanotube/nanowire is to be deposited, just slightly above the top surface of the suspension. The tip is then gradually moved towards the surface of the suspension. A meter such as a current meter 540 is used to monitor the electrical current between the counter electrode and the metal tip. In addition, an appropriate optical magnification device can be used to monitor the gap between the metal tip 530 and the suspension surface 520. When the tip touches the surface of the suspension, the electrical current passing between the two electrodes is detected by the meter 540. Depending on the concentration of the nanostructures in the suspension and the electrical field used, the tip 530 is allowed to stay in contact with for a pre-determined time. The voltage applied between the two electrodes is then turned off and the tip 530 is raised to be above the suspension to stop the deposition process. The metal tip 530 with a carbon nanotube 550 or other nanostructure attached to is vacuum annealed to increase the bonding between the tip and the nanostructure. FIG. 5C is an SEM image of a sharp tip having a single nanotube or nanowire deposited thereon according to the techniques of the present invention.

Another application of the process of the present invention is fabrication of triode-type structures with nanostructured field emission materials deposited in selected areas. Such structures can be used, for example, in field emission flat panel displays; cold cathodes for x-ray tubes, microwave amplifiers, etc.

Figure 6A:
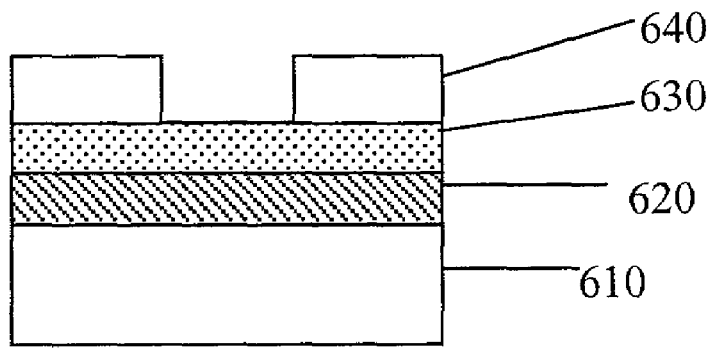
FIG. 6A-6C are a schematic illustrations of a selective deposition process performed according to the present invention.
Figure 6B:
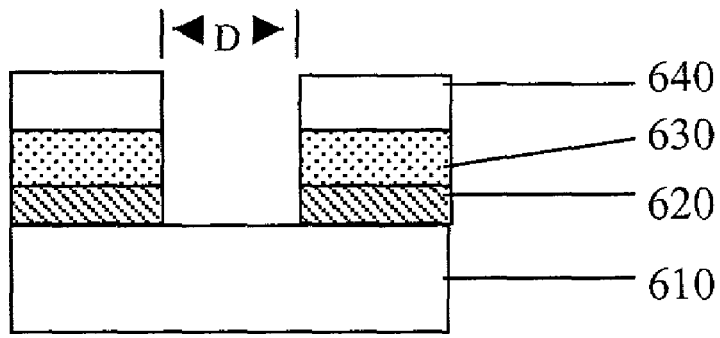
Figure 6C:
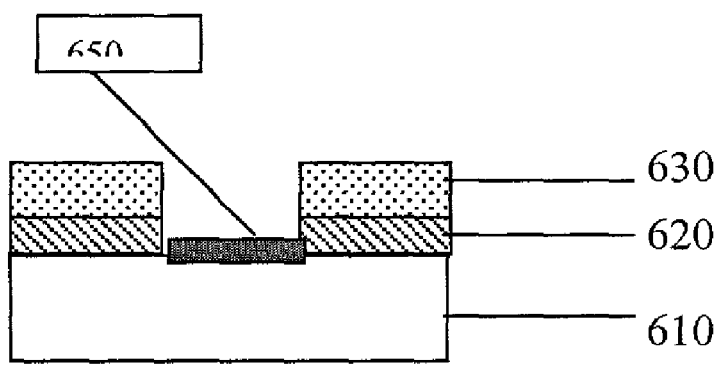

In one embodiment of this application is illustrated in FIGS. 6A-7B, where a multilayer structure comprising a Si substrate 610, a dielectric insulating layer 620 such as silicon dioxide, a conducting layer 630 and a layer of photoresist 640 is fabricated by common thin film fabrication techniques (FIG. 6A). A photo-mask is used to selectively expose the photoresist 640 to ultraviolet light. The multilayer structure is then developed using suitable chemicals to remove the exposed underlying multi-layer structure at the desired locations (FIG. 6B). As illustrated in FIG. 6B, the dimension D of the exposed areas of substrate 610 is small. For example, D can be on the order of 1-100 micrometers, preferably 5-20 micrometers. The exposed areas can be in the form of an array of rounded holes or polygons such as squares. As illustrated in FIG. 6C, carbon nanotubes or other nanostructures are selectively deposited on the exposed Si surfaces of substrate 610 by electrophoresis. In one embodiment, the chemical etched structure is immersed into a carbon nanotube suspension. Contact to the power source is made on the back of surface 610. A metal plate is used as the counter electrode. A bias voltage is also preferably applied to the conductive surface 630 to prevent deposition of carbon nanotubes on the metal surface. Under the applied electrical field, carbon nanotubes will migrate to the exposed surfaces of substrate 610.

For purposes of illustration, the dielectric layer 620 can have a thickness on the order of 1-100 micrometers, preferably 1-10 micrometers.

Figure 7A:
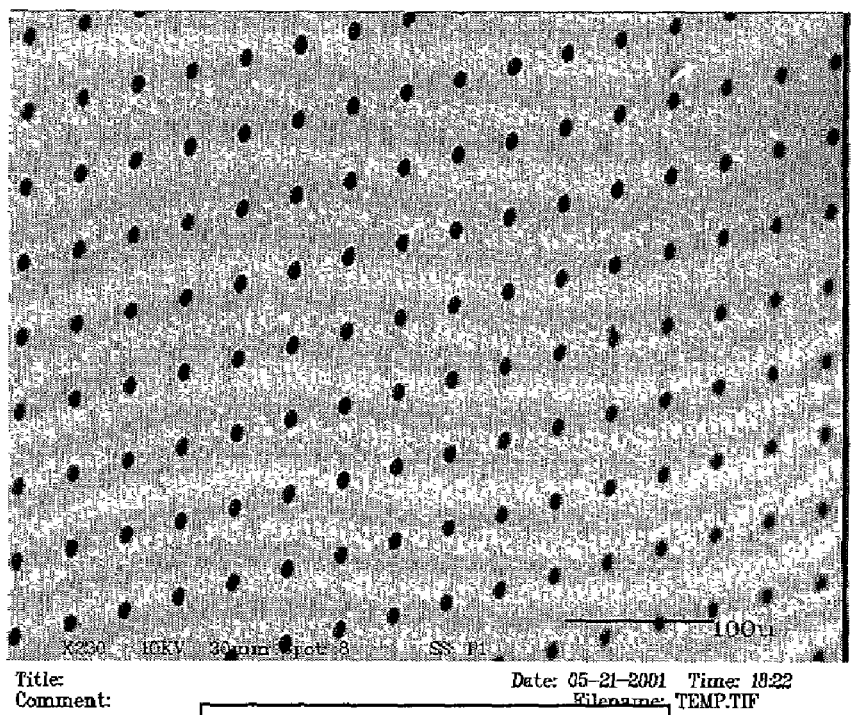
FIGS. 7A and 7B are SEM images showing a top view of a coated surface of a multi-layer structure formed according to a selective deposition process as illustrated in FIGS. 6A-6C.
Figure 7B:
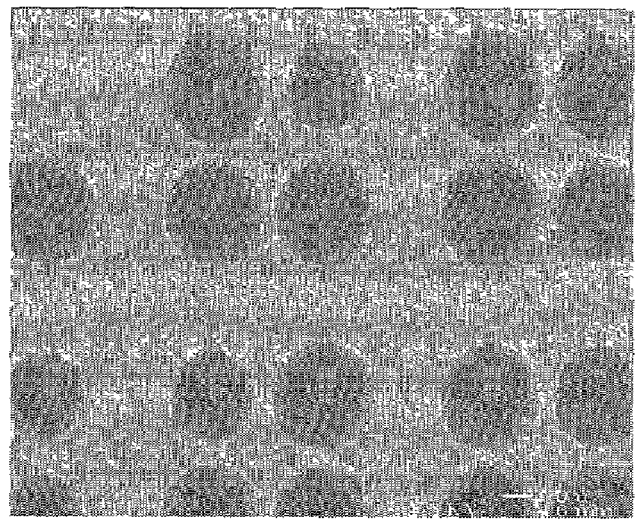

FIG. 7A and 7B show the top view of the etched multi-layer structures formed as described above.

In addition, the electrophoresis method of the present invention can also be utilized to form a patterned deposit of nanostructure-containing material onto a substrate.

FIGS. 8A to 8D illustrate one embodiment of this application. According to the illustrated embodiment, a mask 640 is placed on top of a first surface of a substrate 650 before electrophoresis. The area 670 on the surface of substrate 650 where no deposition is intended is blocked by the mask 640, while the areas 660 on the surface of substrate 650 are exposed to the electrophoresis bath through corresponding openings in the mask 640.

The masked substrate is then introduced into a suspension and coated by electrophoresis in a manner consistent with the present invention, as set forth in detail above.

Figure 8A:
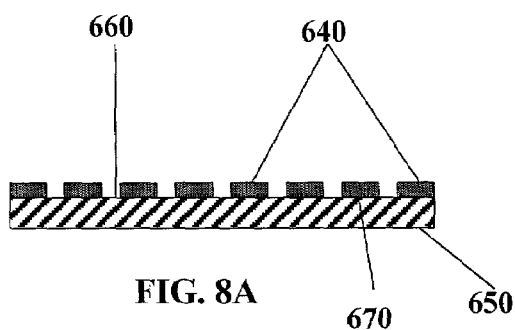
FIGS. 8A-8C are schematic illustrations of an embodiment of a selective deposition process according to the present invention.
Figure 8B:
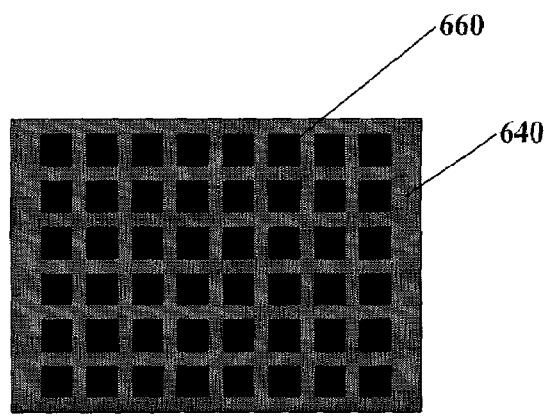
Figure 8C:
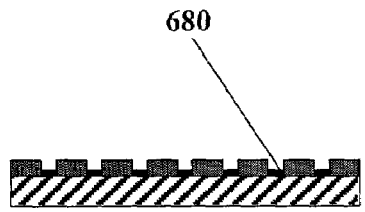
Figure 8D:
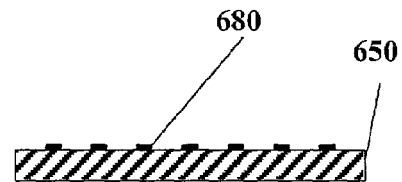
FIG. 8D is a side view of an embodiment of a patterned substrate formed according to the process of FIGS. 8A-8C.

After deposition, the mask 640 is removed from the substrate 650 and a clean patterned structures 680 containing nanostructure-containing material is obtained, as illustrated in FIG. 8D. The dimension(s) and shape(s) of the patterned structures are defined by the openings of the mask 640.

FIGS. 8A and 8B show the side and the top view of the mask-blocked substrate before electrophoresis. FIG. 8C shows the side view of the mask-blocked substrate after electrophoresis. FIG. 8D is the side view of the final structures on the substrate.

While the present invention has been described by reference to the above-mentioned embodiments, certain modifications and variations will be those of ordinary skill in the art. Therefore, the present invention is limited only by the scope and spirit of the appended claims.

What is claimed is:

1. A method of depositing a composite film with at least one component being a nanostructured material onto a substrate, the method comprising:
   (i) forming a suspension of the material in a liquid medium, the nanostructured material comprising at least one of nanotubes and nanowires;
   (ii) adding small particles to the suspension to promote adhesion of the nanostructured material to the substrate, wherein the small particles comprise a metal selected from the group consisting of iron, lead, and cobalt;
   (iii) selectively adding a charger to the liquid medium;
   (iv) immersing electrodes in the suspension, wherein at least one of the electrodes comprises the substrate; and
   (v) applying a direct or alternating current to the immersed electrodes thereby creating an electrical field between the electrodes;
   wherein the nanostructured material and the small particles are co-deposited on the substrate to form a composite layer, the composite layer having an intimate mix of the carbon nanotubes and the small particles, and wherein the composite layer has an emission current density greater than 1 A/cm$^2$.

2. The method of claim 1, wherein the small particles are metallic and have a diameter less than 1 micrometer.

3. The method of claim 2, comprising shortening the carbon nanotubes by chemical reaction prior to their introduction into the suspension.

4. The method of claim 3, wherein the shortening comprises etching single walled carbon nanotube bundles in a solution of $H_2SO_4$ and $HNO_3$ for a period of time between 10 and 24 hours while the nanotubes are subjected to ultrasonic energy.

5. The method of claim 4, wherein the period of time is 24 hours, and further wherein the etching provides single wall carbon nanotubes having an average bundle length of 0.5 micrometers.

6. The method of claim 2, comprising:
adding additional materials into the suspension, the additional materials comprising at least one binder material, wherein the binder material is present in an amount ranging from 0.1-20 weight % of the nanostructured material.

7. The method of claim 1, wherein the composite layer has a threshold field for emission of less than 1.5 V/micrometer.

8. The method of claim 7, wherein the threshold field is 1.4 V/micrometer.

9. The method of claim 1, wherein the composite layer produces a total emission current greater than 10 mA over a 6 mm$^2$ area.

10. The method of claim 1, wherein the composite layer produces a pulsed emission current having a pulse frequency higher than 10 KHz.

11. The method of claim 10, wherein the composite layer produces a pulsed emission current having a pulse frequency higher than 100 KHz.

12. The method of claim 1, wherein the composite layer has a total pulsed current over a 6 mm$^2$ area higher than 10 mA at an electrical field of between 10 and 12 V/micrometer.

13. The method of claim 1, wherein the composite layer produces a stable pulsed current, further wherein the stable pulsed current is higher than 10 mA over a 6 mm$^2$ area for at least 1,000 pulses.

14. The method of claim 13, wherein the stable pulsed current is higher than 10 mA over a 6 mm$^2$ area for at least 10,000 pulses.

15. A method of depositing a composite layer with at least one component being carbon nanotubes onto a substrate, the method comprising:
(i) forming a suspension containing at least the carbon nanotubes and an adhesion promoting material in a liquid medium, the adhesion promoting material further comprising a carbon-dissolving material selected from the group consisting of nickel, iron, cobalt and manganese;
(ii) selectively adding a charger to the liquid medium;
(iii) immersing electrodes in the suspension, wherein at least one of the electrodes comprises the substrate; and
(iv) applying a direct or alternating current to the immersed electrodes thereby creating an electrical field between the electrodes;
wherein the carbon nanotubes and the adhesion promoting material co-deposit on the substrate to form the composite layer, the composite layer having an intimate mix of the carbon nanotubes and the adhesion-promoting material.

16. The method of claim 15 wherein the method further comprises shortening the length of the carbon nanotubes prior to their introduction into the suspension to improve the dispersion and stability of the suspension.

17. The method of claim 16, wherein the method further comprises annealing the carbon nanotubes at 100° C.-1200° C. in a vacuum prior to their introduction into the suspension.

18. The method of claim 15, wherein step (i) further comprises either application of ultrasonic energy or stirring, thereby facilitating the formation of a stable suspension.

19. The method of claim 15, wherein the charger comprises at least one of magnesium chloride, $Mg(NO_3)_2$, $La(NO_3)_3$, $Y(NO_3)_3$, $AlCl_3$, and sodium hydroxide.

20. The method of claim 15 wherein the liquid medium comprises alcohol, and step (i) further comprises forming the suspension having a concentration of 0.1-1.0 mg/mL, expressed as mg of carbon nanotubes per mL of liquid medium.

21. The method of claim 15, wherein step (iv) comprises applying direct current to the electrodes.

22. The method of claim 21, wherein step (iv) comprises creating an electrical field between the electrodes of at least 20 V/cm in intensity.

23. The method of claim 15, further comprising the steps of:
(v) removing the electrodes from the suspension; and
(vi) annealing the coated substrate.

24. The method of claim 23, wherein step (vi) comprises a two-step anneal, comprising heating the coated substrate to a first temperature for a first selected period of time, then heating the coated substrate to a second temperature for a second selected period of time.

25. The method of claim 15, wherein step (i) further comprises adding additional materials into the suspension.

26. The method of claim 25, wherein the additional materials comprise at least one binder material, wherein the binder material is present in an amount ranging from 0.1-20 weight % of the carbon nanotubes.

27. The method of claim 26, wherein the binder material is at least one of poly(vinyl butyral-co-vinyl alcohol-co-vinyl acetate) and poly(vinylidene fluoride).

28. The method of claim 15 wherein the adhesion promoting material comprises small particles and wherein the particles have a diameter less than 1 micrometer.

29. The method of claim 15, comprising:
providing the substrate with a first surface having a mask disposed thereon, the mask having openings through which areas of the first surface are exposed;
immersing the at least one electrode and the masked substrate in the suspension;
applying the direct or alternating current to the electrode and the masked substrate thereby creating an electrical field therebetween, the carbon nanotubes and the adhesion promoting material being caused to migrate toward, and attach to, those exposed areas on the first surface of the substrate; and
removing the mask;
wherein a pattern of the composite layer is deposited onto the substrate.

30. The method of claim 15, wherein the emission current density of the composite layer is greater than 1 A/cm$^2$.

31. A method of depositing a composite layer with at least one component being carbon nanotubes onto a substrate, the method comprising:
(i) forming a suspension containing at least the carbon nanotubes and an adhesion promoting material in a liquid medium, the adhesion promoting material further comprising a carbide-forming material selected from the group consisting of tantalum, niobium, vanadium, and hafnium;
(ii) selectively adding a charger to the liquid medium;
(iii) immersing electrodes in the suspension, wherein at least one of the electrodes comprises the substrate; and
(iv) applying a direct or alternating current to the immersed electrodes thereby creating an electrical field between the electrodes;

wherein the carbon nanotubes and the adhesion promoting material co-deposit on the substrate to form the composite layer, the composite layer having an intimate mix of the carbon nanotubes and the adhesion-promoting material.

32. The method of claim 31 wherein the method further comprises shortening the length of the carbon nanotubes prior to their introduction into the suspension to improve the dispersion and stability of the suspension.

33. The method of claim 32, wherein the method further comprises annealing the carbon nanotubes at 100° C.-1200° C. in a vacuum prior to their introduction into the suspension.

34. The method of claim 31, wherein step (i) further comprises either application of ultrasonic energy or stirring, thereby facilitating the formation of a stable suspension.

35. The method of claim 31, wherein the charger comprises at least one of magnesium chloride, $Mg(NO_3)_2$, $La(NO_3)_3$, $Y(NO_3)_3$, $AlCl_3$, and sodium hydroxide.

36. The method of claim 31 wherein the liquid medium comprises alcohol, and step (i) further comprises forming the suspension having a concentration of 0.1-1.0 mg/mL, expressed as mg of carbon nanotubes per mL of liquid medium.

37. The method of claim 31, wherein step (iv) comprises applying direct current to the electrodes.

38. The method of claim 37, wherein step (iv) comprises creating an electrical field between the electrodes of at least 20 V/cm in intensity.

39. The method of claim 31, further comprising the steps of:
(v) removing the electrodes from the suspension; and
(vi) annealing the coated substrate.

40. The method of claim 39, wherein step (vi) comprises a two-step anneal, comprising heating the coated substrate to a first temperature for a first selected period of time, then heating the coated substrate to a second temperature for a second selected period of time.

41. The method of claim 31, wherein step (i) further comprises adding additional materials into the suspension.

42. The method of claim 41, wherein the additional materials comprise at least one binder material, wherein the binder material is present in an amount ranging from 0.1-20 weight % of the carbon nanotubes.

43. The method of claim 42, wherein the binder material is at least one of poly(vinyl butyral-co-vinyl alcohol-co-vinyl acetate) and pbly(vinylidene fluoride).

44. The method of claim 31 wherein the adhesion promoting material comprises small particles and wherein the particles have a diameter less than 1 micrometer.

45. The method of claim 31, comprising:
providing the substrate with a first surface having a mask disposed thereon, the mask having openings through which areas of the first surface are exposed;
immersing the at least one electrode and the masked substrate in the suspension;
applying the direct or alternating current to the electrode and the masked substrate thereby creating an electrical field therebetween, the carbon nanotubes and the adhesion promoting material being caused to migrate toward, and attach to, those exposed areas on the first surface of the substrate; and
removing the mask;
wherein a pattern of the composite layer is deposited onto the substrate.

46. The method of claim 31, wherein the emission current density of the composite layer is greater than 1 $A/cm^2$.

47. A method of depositing a composite layer with at least one component being carbon nanotubes onto a substrate, the method comprising:
(i) forming a suspension containing at least the carbon nanotubes and an adhesion promoting material in a liquid medium, the adhesion promoting material further comprising a binder selected from the group consisting of poly(vinyl butyral-co-vinyl alcohol-co-vinyl acetate) and poly(vinylidene fluoride);
(ii) selectively adding a charger to the liquid medium;
(iii) immersing electrodes in the suspension, wherein at least one of the electrodes comprises the substrate; and
(iv) applying a direct or alternating current to the immersed electrodes thereby creating an electrical field between the electrodes;
wherein the carbon nanotubes and the adhesion promoting material co-deposit on the substrate to form the composite layer, the composite layer having an intimate mix of the carbon nanotubes and the adhesion-promoting material.

48. The method of claim 47 wherein the method further comprises shortening the length of the carbon nanotubes prior to their introduction into the suspension to improve the dispersion and stability of the suspension.

49. The method of claim 48, wherein the method further comprises annealing the carbon nanotubes at 100° C.-1200° C. in a vacuum prior to their introduction into the suspension.

50. The method of claim 47, wherein step (i) further comprises either application of ultrasonic energy or stirring, thereby facilitating the formation of a stable suspension.

51. The method of claim 47, wherein the charger comprises at least one of magnesium chloride, $Mg(NO_3)_2$, $La(NO_3)_3$, $Y(N)_3)_3$, $AlCl_3$, and sodium hydroxide.

52. The method of claim 47 wherein the liquid medium comprises alcohol, and step (i) further comprises forming the suspension having a concentration of 0.1-1.0 mg/mL, expressed as mg of carbon nanotubes per mL of liquid medium.

53. The method of claim 47, wherein step (iv) comprises applying direct current to the electrodes.

54. The method of claim 53, wherein step (iv) comprises creating an electrical field between the electrodes of at least 20 V/cm in intensity.

55. The method of claim 47, further comprising the steps of:
(v) removing the electrodes from the suspension; and
(vi) annealing the coated substrate.

56. The method of claim 55, wherein step (vi) comprises a two-step anneal, comprising heating the coated substrate to a first temperature for a first selected period of time, then heating the coated substrate to a second temperature for a second selected period of time.

57. The method of claim 47, wherein step (i) further comprises adding additional materials into the suspension.

58. The method of claim 47, wherein the binder is present in an amount ranging from 0.1-20 weight % of the carbon nanotubes.

59. The method of claim 47 wherein the adhesion promoting material comprises small particles and wherein the particles have a diameter less than 1 micrometer.

60. The method of claim 47, comprising:
providing the substrate with a first surface having a mask disposed thereon, the mask having openings through which areas of the first surface are exposed;
immersing the at least one electrode and the masked substrate in the suspension;

applying the direct or alternating current to the electrode and the masked substrate thereby creating an electrical field therebetween, the carbon nanotubes and the adhesion promoting material being caused to migrate toward, and attach to, those exposed areas on the first surface of the substrate; and removing the mask;

wherein a pattern of the composite layer is deposited onto the substrate.

61. The method of claim 47, wherein the emission current density of the composite layer is greater than 1 A/cm$^2$.

62. A method of depositing a layer with at least one component being carbon nanotubes onto a substrate, the method comprising:

(i) forming a suspension containing at least the carbon nanotubes;

(ii) selectively adding a charger to the liquid medium;

(iii) immersing electrodes in the suspension, wherein at least one of the electrodes comprises the substrate; and (iv) applying a direct or alternating current to the immersed electrodes thereby creating an electrical field between the electrodes;

(v) removing the electrodes from the suspension; and (vi) annealing the coated substrate in a two-step annealing process, said two-step annealing process comprising heating the coated substrate to a first temperature for a first selected period of time, then heating the coated substrate to a second temperature for a second selected period of time;

wherein the carbon nanotubes deposit on the substrate to form the layer.

63. The method of claim 62 wherein the first temperature is 100-1200° C., the first selected period of time is approximately one hour, the second temperature is approximately 800° C., and the second selected period of time is approximately two hours.

64. The method of claim 62 wherein the two-step annealing process is done in a vacuum.

65. The method of claim 64, wherein the vacuum is of approximately 5×10$^{-7}$ torr.

66. The method of claim 62 wherein the method further comprises shortening the length of the carbon nanotubes prior to their introduction into the suspension to improve the dispersion and stability of the suspension.

67. The method of claim 66, wherein the method further comprises annealing the carbon nanotubes at 100° C.-1200° C. in a vacuum prior to their introduction into the suspension.

68. The method of claim 62, wherein step (i) further comprises either application of ultrasonic energy or stirring, thereby facilitating the formation of a stable suspension.

69. The method of claim 62, wherein the charger comprises at least one of magnesium chloride, Mg(NO$_3$)$_2$, La(NO$_3$)$_3$, Y(NO$_3$)$_3$, AlCl$_3$, and sodium hydroxide.

70. The method of claim 62 wherein the liquid medium comprises alcohol, and step (i) further comprises forming the suspension having a concentration of 0.1-1.0 mg/mL, expressed as mg of carbon nanotubes per mL of liquid medium.

71. The method of claim 62, wherein step (iv) comprises applying direct current to the electrodes.

72. The method of claim 71, wherein step (iv) comprises creating an electrical field between the electrodes of at least 20 V/cm in intensity.

73. The method of claim 62, wherein step (i) further comprises adding additional materials into the suspension.

74. The method of claim 73, wherein the additional materials comprise at least one binder material, wherein the binder material is present in an amount ranging from 0.1-20 weight % of the carbon nanotubes.

75. The method of claim 74, wherein the binder material is at least one of poly(vinyl butyral-co-vinyl alcohol-co-vinyl acetate) and poly(vinylidene fluoride).

76. The method of claim 62, comprising:

providing the substrate with a first surface having a mask disposed thereon, the mask having openings through which areas of the first surface are exposed;

immersing the at least one electrode and the masked substrate in the suspension;

applying the direct or alternating current to the electrode and the masked substrate thereby creating an electrical field therebetween, the carbon nanotubes and the adhesion promoting material being caused to migrate toward, and attach to, those exposed areas on the first surface of the substrate; and removing the mask;

wherein a pattern of the composite layer is deposited onto the substrate.

77. The method of claim 62, wherein the emission current density of the layer is greater than 1 A/cm$^2$.

78. A method of depositing a layer with at least one component being carbon nanotubes onto a substrate, the method comprising:

(i) forming a suspension containing at least the carbon nanotubes in a liquid medium;

(ii) selectively adding a charger to the liquid medium;

(iii) immersing electrodes in the suspension, wherein at least one of the electrodes comprises the substrate, wherein the substrate is pre-coated with at least one layer of an adhesion-promoting metal selected from the group consisting of titanium, iron, lead, cobalt, nickel, tantalum, tungsten, niobium, zirconium, vanadium, and hafnium; and (iv) applying a direct or alternating current to the immersed electrodes thereby creating an electrical field between the electrodes;

wherein the carbon nanotubes deposit on the substrate to form the composite layer having an intimate mix of the carbon nanotubes and the adhesion promoting metal, and wherein the composite layer has an emission current density greater than 1 A/cm$^2$.

79. The method of claim 78 wherein the method further comprises shortening the length of the carbon nanotubes prior to their introduction into the suspension to improve the dispersion and stability of the suspension.

80. The method of claim 79, wherein the method further comprises annealing the carbon nanotubes at 100° C.-1200° C. in a vacuum prior to their introduction into the suspension.

81. The method of claim 78, wherein step (i) further comprises either application of ultrasonic energy or stirring, thereby facilitating the formation of a stable suspension.

82. The method of claim 78, wherein the charger comprises at least one of magnesium chloride, Mg(NO$_3$)$_2$, La(NO$_3$)$_3$, Y(NO$_3$)$_3$, AlCl$_3$, and sodium hydroxide.

83. The method of claim 78 wherein the liquid medium comprises alcohol, and step (i) further comprises forming the suspension having a concentration of 0.1-1.0 mg/mL, expressed as mg of carbon nanotubes per mL of liquid medium.

84. The method of claim 78, wherein step (iv) comprises applying direct current to the electrodes.

85. The method of claim 84, wherein step (iv) comprises creating an electrical field between the electrodes of at least 20V/cm in intensity.

86. The method of claim 78, further comprising the steps of:
(v) removing the electrodes from the suspension; and
(vi) annealing the coated substrate.

87. The method of claim 86, wherein step (vi) comprises a two-step anneal, comprising heating the coated substrate to a first temperature for a first selected period of time, then heating the coated substrate to a second temperature for a second selected period of time.

88. The method of claim 78, wherein step (i) further comprises adding additional materials into the suspension.

89. The method of claim 88, wherein the additional materials comprise at least one binder material, wherein the binder material is present in an amount ranging from 0.1-20 weight % of the carbon nanotubes.

90. The method of claim 89, wherein the binder material is at least one of poly(vinyl butyral-co-vinyl alcohol-co-vinyl acetate) and poly(vinylidene fluoride).

91. The method of claim 89 wherein the binder material comprises small particles and wherein the particles have a diameter less than 1 micrometer.

92. The method of claim 78, comprising:
providing the substrate with a first surface having a mask disposed thereon, the mask having openings through which areas of the first surface are exposed;
immersing the at least one electrode and the masked substrate in the suspension;
applying the direct or alternating current to the electrode and the masked substrate thereby creating an electrical field therebetween, the carbon nanotubes and the adhesion promoting material being caused to migrate toward, and attach to, those exposed areas on the first surface of the substrate; and
removing the mask;
wherein a pattern of the composite layer is deposited onto the substrate.

93. A method of depositing a composite layer with at least one component being carbon nanotubes onto a substrate, the method comprising:
(i) forming a suspension containing at least the carbon nanotubes and an adhesion promoting material in a liquid medium, wherein the adhesion promoting material is selected from the group consisting of poly(vinyl butyral-co vinyl alcohol-co-vinyl acetate), poly(vinylidene fluoride), titanium, iron, lead, cobalt, nickel, tantalum, tungsten, niobium, zirconium, vanadium, chromium, hafnium, manganese, silicon, and molybdenum, said liquid medium comprising dimethyl formamide (DMF);
(ii) selectively adding a charger to the liquid medium;
(iii) immersing electrodes in the suspension, wherein at least one of the electrodes comprises the substrate; and
(iv) applying a direct or alternating current to the immersed electrodes thereby creating an electrical field between the electrodes;
wherein the carbon nanotubes and the adhesion promoting material co-deposit on the substrate to form the composite layer, the composite layer having an intimate mix of the carbon nanotubes and the adhesion-promoting material, and wherein the composite layer has an emission current density greater than 1 A/cm$^2$.

94. A method of depositing a composite film with at least one component being a nanostructured material onto a substrate, the method comprising:
(i) forming a suspension of the material in a liquid medium, the nanostructured material comprising at least one of nanotubes and nanowires;
(ii) adding small particles to the suspension to promote adhesion of the nanostructured material to the substrate, wherein the small particles comprise a metal selected from the group consisting of iron, lead, and cobalt;
(iii) selectively adding a charger to the liquid medium;
(iv) immersing electrodes in the suspension, wherein at least one of the electrodes comprises the substrate; and
(v) applying a direct or alternating current to the immersed electrodes thereby creating an electrical field between the electrodes;
wherein the nanostructured material and the small particles are co-deposited on the substrate to form a composite layer, and further wherein the composite layer;
(a) comprises an intimate mix of the carbon nanotubes and the small particles;
(b) produces an emission current density greater than 1 A/cm$^2$;
(c) has a threshold field for emission of less than 1.5 V/micrometer; and
(d) produces a total emission current greater than 10 mA over a 6 $^2$ mm area, a pulsed emission current having a pulse frequency higher than 100 KHz, and a total pulsed current measured over a 6 mm$^2$ area of greater than 10 mA at between 10 and 12 V/micrometer for at least 1,000 pulses.

95. The method of claim 94, wherein the total pulsed current measured over a 6 mm$^2$ area is greater than 10 mA at between 10 and 12 V/micrometer for at least 10,000 pulses.

96. A method of depositing a multilayer coating onto a substrate, the method comprising:
(i) forming a plurality of stable liquid suspensions, wherein each suspension comprises carbon nanotubes and at least one or more component selected from a polymer and metal particles, wherein the polymer is selected from the group consisting of poly(vinyl butyral-co vinyl alcohol-co-vinyl acetate) and poly (vinylidene fluoride), and the metal particles are selected from the group consisting of titanium, iron, lead, cobalt, nickel, tantalum, tungsten, niobium, zirconium, vanadium, chromium, hafnium, manganese, silicon, and molybdenum;
(ii) selectively adding a charger to each of the plurality of stable liquid suspensions;
(iii) immersing electrodes into one of the plurality of stable liquid suspensions, wherein at least one of the electrodes comprises the substrate;
(iv) applying a direct or alternating current to the immersed electrodes thereby creating an electrical field between the electrodes, wherein the carbon nanotubes and the at least one other component migrate toward and attach to the substrate to form a composite layer, wherein the applying is for a period of time until a desired thickness of the composite layer is reached;
(v) removing the electrodes from the stable liquid suspension;
(vi) immersing the electrodes into another of the plurality of stable liquid suspensions and repeating steps (iv) and (v); and (vii) repeating step (vi) until the electrodes have been immersed into each of the plurality of stable liquid suspensions, thereby depositing a multilayer coating onto the substrate.

97. The method of claim 96, further comprising annealing the substrate following the deposition of the multilayer coating.

98. The method of claim 97, wherein the annealing comprises a two-step anneal comprising heating the coated substrate to a first temperature for a first selected period of time and then heating the coated substrate to a second temperature for a second selected period of time.

99. The method of claim 96, wherein the emission current density of the multilayer coating is greater than 1 $A/cm^2$.

100. A method of depositing a carbon nanotube film having a stable pulsed current higher than 10 mA over a 6 $mm^2$ area for at least 1,000 pulses, the method comprising:
(i) forming a suspension containing at least the carbon nanotubes and an adhesion promoting material in a liquid medium, the adhesion promoting material comprising one of the group selected from a carbon-dissolving material and a carbide-forming material, wherein the carbon-dissolving material is selected from the group consisting of nickel, iron, cobalt and manganese, and the carbide-forming material is selected from the group consisting-of silicon, molybdenum titanium, tantalum, tungsten, niobium, zirconium, vanadium, chromium, and hafnium;
(ii) selectively adding a charger to the liquid medium;
(iii) immersing electrodes in the suspension, wherein at least one of the electrodes comprises the substrate; and
(iv) applying a direct or alternating current to the immersed electrodes thereby creating an electrical field between the electrodes;
wherein the carbon nanotubes and the adhesion promoting material co-deposit on the substrate to form the composite film, the composite film having an intimate mix of the carbon nanotubes and the adhesion-promoting material, and further wherein the composite film has a stable pulsed current higher than 10 mA over a 6 $mm^2$ area for at least 1,000 pulses.

101. The method of claim 100, wherein the composite film has a stable pulsed current higher than 10 mA over a 6 $mm^2$ area for at least 10,000 pulses.

102. A method of depositing a carbon nanotube film that displays 3% or less emission current decay after 10 hours, the method comprising:
(i) forming a suspension containing at least the carbon nanotubes and an adhesion promoting material in a liquid medium, the adhesion promoting material comprising one of the group selected from a carbon-dissolving material and a carbide-forming material, wherein the carbon-dissolving material is selected from the group consisting of nickel, iron, cobalt and manganese, and the carbide-forming material is selected from the group consisting of silicon, molybdenum titanium, tantalum, tungsten, niobium, zirconium, vanadium, chromium, and hafnium;
(ii) selectively adding a charger to the liquid medium;
(iii) immersing electrodes in the suspension, wherein at least one of the electrodes comprises the substrate; and
(iv) applying a direct or alternating current to the immersed electrodes thereby creating an electrical field between the electrodes;
wherein the carbon nanotubes and the adhesion promoting material co-deposit on the substrate to form the composite film, the composite film having an intimate mix of the carbon nanotubes and the adhesion-promoting material, and further wherein the composite film displays 3% or less emission current decay after 10 hours.

103. An electrophoretic method of depositing a composite film comprising a carbon nanotube material onto a conducting substrate, the method comprising:
(i) forming a liquid suspension comprising the carbon nanotubes, particles of adhesion-promoting material, and a charger, wherein the suspension has a nanotube concentration of 0.1-1.0 mg/mL, expressed as mg of carbon nanotubes per mL of liquid medium and wherein the particles of adhesion promoting material is selected from the group consisting of poly(vinyl butyral-co vinyl alcohol-co-vinyl acetate), poly(vinylidene fluoride), titanium, iron, lead, cobalt, nickel, tantalum, tungsten, niobium, zirconium, vanadium, chromium, hafnium, manganese, silicon, and molybdenum;
(ii) immersing electrodes in the suspension, wherein at least one of the electrodes comprises the substrate;
(iii) applying an electric field in the range of 0.1-1000 V/cm between the electrodes, wherein the nanotubes and the particles of adhesion-promoting material co-deposit on the substrate; and
(iv) annealing the substrate, wherein the annealing comprises a two-step anneal comprising heating the coated substrate to 100-1200° C. for approximately 1 hour and then to approximately 800° C. for two hours.

104. A method of depositing a composite film onto one conducting surface of a substrate having at least two electrically insulated conducting surfaces, wherein the composite film comprises carbon nanotubes, the method comprising:
(i) forming a liquid suspension comprising carbon nanotubes and particles of an adhesion promoting material in a liquid medium, wherein the adhesion promoting material is selected from the group consisting of a carbon-dissolving material and a carbide-forming material, wherein the carbon-dissolving material is selected from the group consisting of nickel, iron, cobalt and manganese, and the carbide-forming material is selected from the group consisting of silicon, molybdenum titanium, tantalum, tungsten, niobium, zirconium, vanadium, chromium, and hafnium;
(ii) selectively adding a charger to the liquid medium;
(iii) immersing electrodes in the suspension, wherein at least one of the electrodes comprises the substrate and another of the electrodes comprises a counter electrode, wherein the substrate comprising two electrically insulated conducting surfaces, surface A and surface B;
(iv) applying an electrical field between surface A and the counter electrode, wherein the field strength is between 0.1-1000 V/cm, thereby causing the carbon nanotubes and the particles of the adhesion promoting material to migrate towards and co-deposit onto surface A; and
(v) applying a small bias electrical field on surface B to prevent deposition of the carbon nanotubes and particles onto surface B.

105. The method of claim 104, wherein surface B is covered by a layer of photoresist.

106. The method of claim 104, further comprising annealing the coated substrate to form a film on surface A, wherein the emission current density of the film is greater than 1 $A/cm^2$.

* * * * *